(12) United States Patent
Zou et al.

(10) Patent No.: US 9,134,821 B2
(45) Date of Patent: Sep. 15, 2015

(54) METHOD AND DEVICE FOR IMPLEMETING ORIGINAL CALLIGRAPHY OF HANDWRITING

(75) Inventors: Xueping Zou, Beijing (CN); Jia Zhou, Beijing (CN); Guoying Du, Beijing (CN)

(73) Assignee: BEIJING ERENEBEN INFORMATION TECHNOLOGY CO., LTD., Beijing (CN)

( * ) Notice: Subject to any disclaimer, the term of this patent is extended or adjusted under 35 U.S.C. 154(b) by 149 days.

(21) Appl. No.: 13/981,083

(22) PCT Filed: Jan. 18, 2012

(86) PCT No.: PCT/CN2012/070501
§ 371 (c)(1),
(2), (4) Date: Oct. 7, 2013

(87) PCT Pub. No.: WO2012/097729
PCT Pub. Date: Jul. 26, 2012

(65) Prior Publication Data
US 2014/0055428 A1  Feb. 27, 2014

(30) Foreign Application Priority Data
Jan. 20, 2011  (CN) .......................... 2011 1 0022935

(51) Int. Cl.
*G06F 3/0354* (2013.01)
*G06T 11/20* (2006.01)
*G06F 3/0488* (2013.01)

(52) U.S. Cl.
CPC ........ *G06F 3/03545* (2013.01); *G06F 3/04883* (2013.01); *G06T 11/203* (2013.01)

(58) Field of Classification Search
CPC ........................ G06F 3/04883; G06F 3/03545
USPC .......... 345/173, 174, 179; 382/119, 123, 137, 382/186, 203, 204, 182; 348/161; 283/57, 283/58; 395/142, 140, 141, 144, 275; 340/705
See application file for complete search history.

(56) References Cited

U.S. PATENT DOCUMENTS 4,739,317 A * 4/1988 Berry et al. .................... 345/441
5,134,689 A * 7/1992 Murakami et al. ............. 345/443

(Continued)

FOREIGN PATENT DOCUMENTS

| | | |
|---|---|---|
| CN | 101118650 | 2/2008 |
| CN | 101226441 | 7/2008 |
| CN | 102081803 | 6/2011 |

*Primary Examiner* — Shaheda Abdin
(74) *Attorney, Agent, or Firm* — Dicke, Billig & Czaja, PLLC

(57) ABSTRACT

Provided are a method and device for implementing the original calligraphy of handwriting. The method comprises: carrying out a real time sampling of a contact to obtain position information about the sampling point and the pen width at the sampling point; determining a central line of the stroke determined by adjacent sampling points; determining position information about a key point of the corresponding stroke according to the central line and the pen width at the sampling point; dividing the key point of the stroke into groups to determine the type thereof; generating a calligraphy outline of the corresponding stroke by drawing an arc and/or a line according to the type of the key point and the position information about the same; and finally filling the outline for displaying. The displayed handwriting trace has the same calligraphy of handwriting as characters written on paper.

14 Claims, 3 Drawing Sheets

(56) References Cited

U.S. PATENT DOCUMENTS 5,155,813 A * 10/1992 Donoghue et al. ............ 345/179
5,594,855 A * 1/1997 Von Ehr et al. ............... 345/442
2005/0162413 A1 * 7/2005 Dresevic et al. .............. 345/179

* cited by examiner

METHOD AND DEVICE FOR IMPLEMETING ORIGINAL CALLIGRAPHY OF HANDWRITING

FIELD OF THE INVENTION

The present application relates to handwriting input technology, specifically relates to a method and device for implementing a stylized trace of an original handwriting trace.

BACKGROUND OF THE INVENTION

With the continuous development of science and technology, various electronic devices with handwriting input system have entered the market, such as phones, e-books, and tablet PCs equipped with handwriting function.

The handwriting tablet PC, for example, integrate with handwriting input system, have replaced traditional keyboard inputs and satisfied the needs of mobile office easily in an all-round way; in use, after a user enters texts or graphics on the handwriting input system through a handwriting pen, the text or graphics will display directly on the display interface of the tablet PC.

However, the method for processing a handwriting trace adopted in the handwriting input systems of the tablet PC in market are mainly the following two types:

The first one is to line up the points where the handwriting pen passes through to form an inputted handwriting trace; the handwriting trace achieved accordingly is not smooth enough and lack of a real effect of handwriting stylized trace.

The second one is implemented with curve fitting, that is, computing a smooth curve closest to all sampling points, and drawing the curve with curve drawing function provided by a graphics system; the algorithm adopted in this method is complex and difficult to be implemented.

Thus, a method for implementing a stylized trace of an original handwriting trace to overcome the shortcoming listed above is an urgent need.

SUMMARY OF THE INVENTION

A main object of the present application is to provide an easy and simple method and device for implementing a stylized trace of an original handwriting trace, so that the handwriting trace handwritten by a user has the same stylized trace as handwritten on paper, thus improving user's handwriting experience.

A method for implementing a stylized trace of an original handwriting trace is provided in the present application to achieve the above-mentioned main object, comprising:

a step of sampling and detecting: sampling on contact points in real time, detecting the position information about the sampling points, and obtaining the stroke width d at the sampling points;

a step of determining central line: determining a central line of a stroke between adjacent sampling points, where the adjacent sampling points are two endpoints of the central line;

a step of computing position information about key points: computing position information about the key points of the stroke in accordance with the central line and the corresponding stroke width d at the sampling points, where the key points of the stroke include the two endpoints of the central line of the stroke between adjacent sampling points as well as the upper and lower endpoints corresponding to the two endpoints;

a step of dividing key points: dividing the key points of the stroke into groups to determine the type thereof as semi-circle points, arc points, or straight line points according to whether the stroke is intersected with other stokes;

a step of generating a stylized trace: generating an outline of the stylized trace of the corresponding stroke by drawing an arc and/or a line according to the position information and the type of the key points of the stroke, and filling the outline for displaying.

According to an embodiment of the present application, the step of generating a stylized trace comprises drawing an arc and/or a line to generate an outline of the stylized trace of the corresponding stroke by calling a graphics library module, and filling the outline for displaying through the graphics library module.

According to an embodiment of the present application, the step of sampling and detecting comprises detecting a pressure value about the sampling points, and obtaining the stroke width d of the sampling points based on the pressure value about the sampling points.

According to an embodiment of the present application, the step of computing position information about key points comprises: determining the upper and lower points corresponding to the two endpoints of the central line in accordance with the central line and the stroke width d at the endpoint of the central line.

According to an embodiment of the present application, determining the upper and lower endpoints corresponding to the endpoint of the central line comprises: determining the points on a straight line with a distance $$\frac{d}{2}$$

away from the endpoint of the central line as the upper endpoint and lower endpoint corresponding to the endpoint of the central line, where the straight line is perpendicular to the central line and intersected with the endpoint of the central line.

According to an embodiment of the present application, determining the upper and lower endpoints corresponding to the endpoint of the central line comprises: determining the unit normal vector perpendicular to the central line, at the endpoint of the central line, the upper endpoint of the stroke corresponding to the endpoint of the central line is obtained by $$\frac{d}{2} \cdot \vec{i},$$

and the lower endpoint of the stroke corresponding to the endpoint of the central line is obtained by $$\frac{d}{2} \cdot (-\vec{i}).$$

According to an embodiment of the present application, dividing the key points of the stroke into groups to determine the type thereof in the step of dividing key points comprises: if one end or both ends of the stroke are failed to intersect with other strokes, the end failed to intersect with other strokes is the stroke end of the stroke, the endpoint of the central line corresponding to the stroke end as well as the upper and lower endpoints corresponding to the endpoint of the central line are a group of semi-circle points.

According to an embodiment of the present application, dividing the key points of the stroke into groups to determine the type thereof in the step of dividing key points comprises: if the stroke is intersected with other strokes, judging whether the intersection angle between the central lines of the two intersected strokes is equal to 180°, if yes, no management is treated to the intersection point between the two intersected strokes, otherwise, the two outer endpoints at the side where the intersection angle between the central lines of the two intersected strokes is larger than 180° are determined as a group of arc points, where the two outer endpoints are respectively an upper endpoint or a lower endpoint at the intersection between the two intersected strokes; two upper endpoints and two lower endpoints of the stroke between adjacent sampling points are respectively determined as a group of straight line points.

According to an embodiment of the present application, the step of generating a stylized trace comprises: if the received key points are determined as a group of semi-circle points, draws a semi-circle by taking the endpoint of the central line within the group of semi-circle points as the center $$\frac{d}{2}$$

accordingly as the radius, and the upper and lower endpoints within the group of semi-circle points as starting and ending points.

According to an embodiment of the present application, the step of generating a stylized trace comprises: if the received key points are determined as a group of arc points, draws an arc by taking one upper endpoint or lower endpoint within the group of arc points as a starting point $$\frac{d}{2}$$

accordingly as the radius, the other upper endpoint or lower endpoint within the group of arc points as an ending point; if the received key points are determined as a group of straight line points, draws a straight line by taking one upper endpoint or lower endpoint within the group of straight line points as a starting point, and the other upper endpoint or lower endpoint within the group of straight line points as an ending point.

A device for implementing a stylized trace of an original handwriting trace is also provided herein, comprising:

a sampling module, configured for sampling on contact points in real time, detecting the position information about the sampling points, and obtaining a stroke width d at the sampling points;

an arithmetic processing module, connected to the sampling module, configured for determining a central line of a stroke between adjacent sampling points according to the position information about the sampling points, where the adjacent sampling points are two endpoints of the central line, computing the position information about the key points of the stroke in accordance with the central line and the stroke width d at the corresponding sampling points, and dividing the key points of the stroke into groups to determine the type thereof as semi-circle points, arc points or straight line points according to whether the stroke is intersected with other strokes; and a graphics library module, connected to the arithmetic processing module, configured for generating an outline of the stylized trace of the corresponding stroke in accordance with the position information and the type of the key points, and filling the outline for displaying;

where the key points of the stroke include the two endpoints of the central line of the stroke between adjacent sampling points as well as the upper and lower endpoints respectively corresponding to the two endpoints.

According to an embodiment of the present application, the sampling module is a pressure sampling module which detects the pressure value about the sampling point, and obtains the stroke width d at the sampling points in accordance with the detected pressure value about the sampling point.

The method or device for implementing a stylized trace of an original handwriting trace disclosed herein is realized by carrying out a real time sampling of contact points, obtaining position information about the sampling point and the stroke width at the sampling points, determining a central line of a stroke determined by adjacent sampling points, computing position information about the key points of the corresponding stroke according to the central line and the stroke width at the sampling points, dividing the key points of the stroke into groups to determine the type thereof, generating an outline of the stylized trace of the corresponding stroke by drawing an arc and/or a line according to the type of the key points and the position information about the same, and finally filling the outline for displaying. The displayed handwriting trace has the same stylized trace as handwritten on paper.

Furthermore, since the step of generating a stylized trace in the method disclosed herein may be carried out by directly calling a graphics library module to draw an arc and/or a line so as to generate an outline of the stylized trace of a corresponding stroke, and directly calling the graphics library module to fill the outline for displaying, the original handwriting trace having stylized trace can be displayed by directly calling relative functions provided by the graphics library module in the method herein, only the position information and type of the corresponding strokes are needed to be sent to the graphics library module.

DETAILED DESCRIPTION OF THE INVENTION

Almost every graphics library module provides functions of drawing a straight line, a polyline, an arc, etc. as well as a corresponding fill function. However, the line width of a curve drawn with the graphics library module is fixed, which cannot achieve a real effect of stylized trace, i.e., a writer's personalized style reflected in his/her handwriting trace. The method for implementing a stylized trace of an original handwriting trace, i.e., the handwriting trace emulating a writer's original trace of handwriting on paper, disclosed herein draws an outline of stylized trace, i.e., the outline, profile, or contour of the stylized trace, by directly calling the graphics library module, then fills the outline with the fill function of the graphics library module for displaying, so that the displayed handwriting trace has the same stylized trace as written in a traditional way, thus improving users' handwriting experience.

The present application will be described in further details with following specific embodiments in conjunction with the accompanying drawings.

During writing, different pressures may usually be applied when writing different strokes, for example higher pressure at the last point of the stroke and less pressure at the first point of the stroke. With the changes of pressure, the thickness of the handwritten stroke may be changed, thus the effect of stylized trace may be shown.

Figure 5:
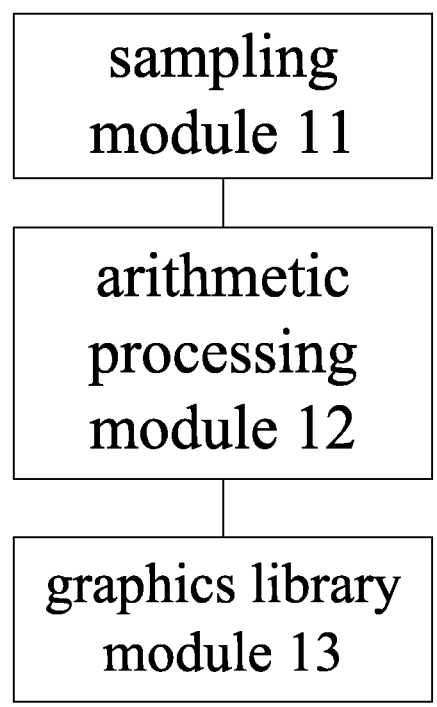
FIG. 5 is a schematically block view of the device for implementing a stylized trace of an original handwriting trace according to an embodiment of the present application.

For an embodiment as shown in FIG. 5, the device for implementing a stylized trace of an original handwriting trace comprises a sampling module 11, an arithmetic processing module 12 and a graphics library module 13. The sampling module 11 may be a pressure sampling module 11, which samples on contact points in real time according to the physical strength of handwriting, detects the position information about the sampling points, and obtains a stroke width d at the sampling points.

The arithmetic processing module 12, connected to the sampling module 11, is configured for determining a central line of the stroke between adjacent sampling points according to the position information about the sampling points, where the adjacent sampling points are two endpoints of the central line, computing the position information about the key points of the stroke based on the central line and the stroke width d at corresponding sampling points, and dividing the key points of the stroke into groups to determine the type thereof as semi-circle points, arc points or straight line points in accordance with whether the stroke intersects with other strokes. The key points of the stroke include the two endpoints of the central line of the stroke between adjacent sampling points, as well as the upper and lower endpoints respectively corresponding to the two endpoints.

The graphics library module 13, connected to the arithmetic processing module 12, stores a one-to-one correspondence between pressure value and stroke width, and is configured for generating an outline of the stylized trace of the corresponding stroke in accordance with the position information and type of the key points, filling the outline for displaying.

A method for implementing a stylized trace of an original handwriting trace in this embodiment is described by taking a tablet PC as the carrier, and the method comprises following steps:

a step of sampling and detecting: sampling on contact points handwritten by user in real time, detecting the position information and pressure value about the sampling points, and obtaining the stroke width d at the sampling points according to the pressure value about the sampling points;

a step of determining central line: determining a central line of a stroke between adjacent sampling points, where the adjacent sampling points are two endpoints of the central line; the central line can be determined according to the position information about the adjacent sampling points.

a step of computing position information about key points: computing position information about the key points of the stroke in accordance with the central line and the stroke width of corresponding sampling points, where the key points of the stroke include the two endpoints of the central line of the stroke between adjacent sampling points as well as the upper and lower endpoints corresponding to the two endpoints;

a step of dividing key points: dividing the key points of the stroke into groups to determine the type thereof as semi-circle points, arc points or straight line points in accordance with whether the stroke is intersected with other strokes;

a step of generating stylized trace: generating an outline of the stylized trace of the corresponding stroke by drawing an arc and/or a line in accordance with the position information and type of the key points of the stroke, for example, when the received key points are a group of semi-circle points, drawing a semi-circle with a corresponding radius of $$\frac{d}{2}$$

at the position corresponding to the group of semi-circle points, when the received key points are a group of straight line points, drawing a straight line based on the corresponding starting and ending points within the group of straight line points, when the received key points are a group of arc points, drawing an arc with a corresponding radius of $$\frac{d}{2}$$

at the position of the group of arc points so as to form an outline of the stroke, then filling the outline for displaying.

Figure 1:
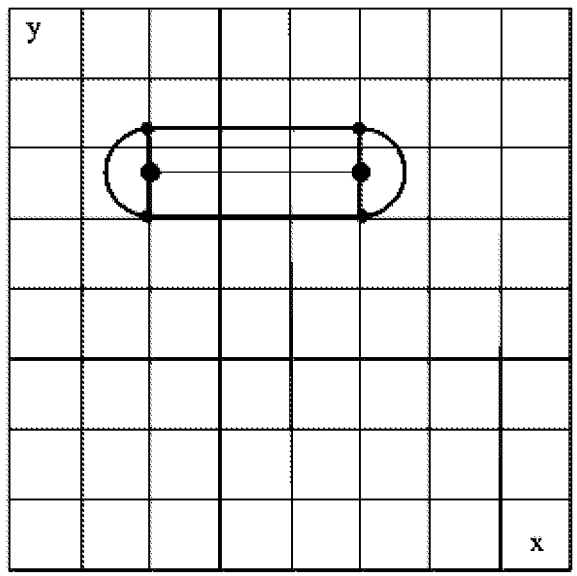
FIG. 1 is a schematic view of a stroke failed to intersect with other strokes according to an embodiment of the present application.

In the step of generating a stylized trace in this embodiment, the graphics library module can be called directly when drawing an arc and/or a line to generate an outline of the stylized trace of the corresponding stroke, and the fill function provided by a graphics library module can also be called directly to fill the outline for displaying, therefore, only the position information and type of the key points of corresponding stroke are needed to be sent to the graphics library module, which are as followings:

In the embodiment, a character is split into individual strokes and the relation between the strokes is nothing more than the following two types: 1. a single stroke exists alone; 2. a stroke intersects with another stroke. The stroke proposed in the embodiment is an individual stroke determined by adjacent sampling points, not a stroke referred to a Chinese character, even for a stroke of a Chinese character, such as bending, turning and hooking, should split into multiple continuous individual strokes determined by a sampling starting point and a sampling ending point. In accordance with the above circumstance, when a single stroke exists alone, it is need to deal with a real-time changes width of the stroke as well as the two endpoints of the stroke, that is the outline of the stroke drawn by the graphics library module is composed of two straight lines and two semi-circles, see FIG. 1; where the strokes are intersected, the intersection point of the strokes is needed to be processed, that is the point of the central line of the two intersected strokes is needed to be processed correspondingly so that a smooth transition may be produced at the intersection point of the two intersected strokes.

During writing, due to the real-time changes of the thickness of the strokes, in the embodiment, the handwritten contact points is sampled in real time to obtain the position information and the stroke width about the sampling points, where the position information is the coordinate value of the sampling points, a stroke is determined by every two adjacent sampling points, then the determined strokes is processed correspondingly in accordance with the obtained position information and the stroke width about the sampling points, which are as followings:

The relationship between pressure value and stroke width is stored in advance in a storage device, and a corresponding stroke width can be obtained according to the pressure value about the sampling points, for example, dividing the pressure into 1024 grades and establishing a one-to-one correspondence between pressure value and stroke width which may be represented as a function, a table or the like, then a corresponding stroke width can be obtained according to the detected pressure value. To achieve a higher accuracy, the pressure can also be divided into a higher grade, such as divided into 2048 grades.

The sampling frequency for real-time sampling can be set according to the actual situation, for example, when handwriting regular script, selecting a lower sampling frequency may be satisfied due to the relatively slow speed of handwriting, or when handwriting running script or cursive script, a higher sampling frequency may be selected due to a relatively high speed of handwriting, so as to ensure the effect of handwriting trace. A sampling frequency of 120 times per second may be preferably chosen in an embodiment to ensure the effect of handwriting trace.

Sampling and detecting the handwritten contact points based on a chosen sampling frequency, and a stroke is determined by adjacent sampling points, for example, if the sampling points 1, 2 and 3 are collected in time sequence, the sampling points 1, 2 are adjacent sampling points, and a stroke is determined by taking the sampling point 1 as a sampling starting point, the sampling point 2 as a sampling ending point, similarly, the sampling points 2, 3 are adjacent sampling points, and a stroke is determined by taking the sampling point 2 as a sampling starting point, the sampling point 3 as a sampling ending point, and so on.

Figure 2:
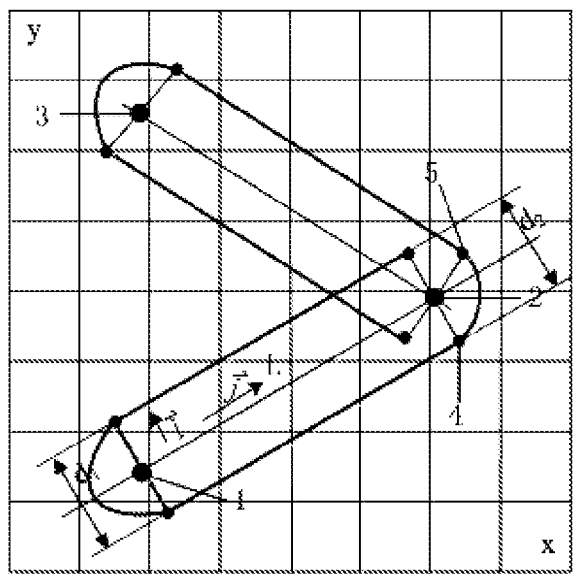
FIG. 2 is a first schematic view of processing an arc point of two intersected strokes according to an embodiment of the present application.

Then according to the adjacent sampling points obtained at the step of sampling and detecting, determining a central line of the stroke determined by the adjacent sampling points, where the central line can be determined by the position information about the adjacent sampling points. For further illustration, the sampling points 1, 2 are taken as an example in the embodiment, referring to FIG. 1, the actual stroke widths of the sampling points 1, 2 are $d_1$, $d_2$ and the coordinates are (x1, y1) and (x2, y2), where the width of the stroke determined by the sampling points 1, 2 is determined by $d_1$ and $d_2$, and a central line L is obtained according to the coordinates information of the sampling points 1, 2. Referring to FIG. 2, the sampling points 1, 2 are the two endpoints of the central line L.

After obtaining the central line L determined by the sampling points 1, 2, the upper and lower endpoints of the stroke can be determined by the stroke widths $d_1$ and $d_2$ of the sampling points 1, 2, that is, the upper and lower endpoints are located on a straight line and away from the endpoint of the central line L with a distance of $$\frac{d}{2},$$

where the straight line which is perpendicular to the central line L and intersected with the endpoint of the central line L, to make a detailed description, the upper and the lower endpoints corresponding to the endpoint 1 of the central line are taken as an example hereinafter, which is as follows: given a unit vector of the central line L is $\vec{j}$, a unit normal vector $\vec{i}$ of the central line L is obtained by counterclockwise rotating $\vec{j}$ of 90°, correspondingly, $-\vec{i}$ is a vector obtained by clockwise rotating $\vec{j}$ of 90°. At the endpoint 1 of the central line L, the upper endpoint of the stroke corresponding to the endpoint 1 of the central line is obtained by $$\frac{d}{2} \cdot \vec{i},$$

and the lower endpoint of the stroke corresponding to the endpoint 1 of the central line is obtained by $$\frac{d}{2} \cdot (-\vec{i}),$$

thus obtaining the position information about the upper and lower endpoints of the stroke corresponding to the endpoint 1 of the central line L, correspondingly, the orientation of the upper endpoint in the embodiment may be that of the vector $\vec{i}$ obtained by clockwise rotating the unit vector $\vec{j}$ of the central line L of 90°, and the orientation of the lower endpoint may be that of the vector $-\vec{i}$ obtained by counterclockwise rotating the unit vector $\vec{j}$ of the central line L of 90°. The determination of the upper and lower endpoints of the endpoint 2 of the central line L is similar to that of the endpoint 1 of the central line L, so the key points of the stroke determined by the sampling points 1, 2 can be determined, which are the endpoints 1, 2 of the central line L as well as the upper and lower endpoints corresponding to the endpoints 1, 2 of the central line L.

Figure 3:
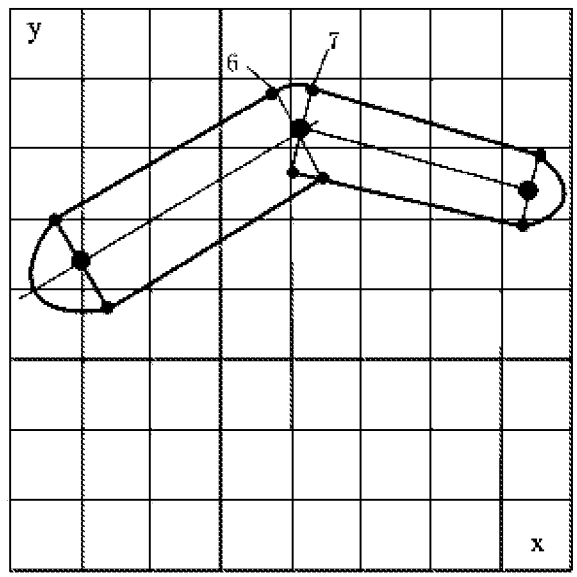
FIG. 3 is a second schematic view of processing an arc point of two intersected strokes according to an embodiment of the present application.
Figure 4:
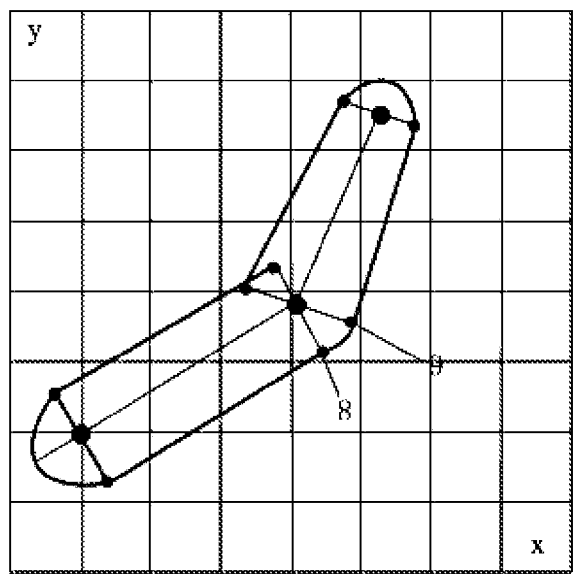
FIG. 4 is a third schematic view of processing an arc point of two intersected strokes according to an embodiment of the present application.

After determining the position information about the key points, based on judging whether the strokes determined by adjacent sampling points are intersected with other strokes, dividing the key points of the strokes determined by adjacent sampling points into groups as semi-circle points, arc points or straight line points, which are as follows: judging whether a stroke determined by two adjacent sampling points is intersected with other strokes, if one end or both ends of the stroke are failed to intersect with other strokes, the end failed to intersect with other strokes is a stroke end (which may be a last point of the stroke or a first point of the stroke), the upper and lower endpoints corresponding to the stroke end as well as the endpoints of the central line corresponding to the upper and lower endpoints are determined as a group of semi-circle points. If the stroke determined by two adjacent sampling points is intersected with other strokes, judging whether the angle between the central lines of the two intersected strokes is equal to 180°, if yes, no management is treated to the intersection point between the two intersected strokes, otherwise, the two outer endpoints at the side where the angle between the central lines of the two intersected strokes is larger than 180° are determined as a group of arc points, where the two outer endpoints are respectively the upper endpoint or the lower endpoint at the intersection point between the two intersected strokes, two upper endpoints and two lower endpoints of the strokes determined by two sampling points are respectively a group of straight line points. The strokes determined by the sampling points 1, 2 and the sampling points 2, 3 are taken as an example hereinafter to make a further description:

Referring to FIG. 2, the endpoint 1 of the central line L is failed to intersect with the central lines of other strokes, the endpoint 1 is the stroke end of the stroke determined by the sampling points 1, 2, the endpoint 1 of the central line L as well as the upper and lower endpoints corresponding to the endpoint 1 are a group of semi-circle points; where the endpoint 2 of the central line L is intersected with the central line of the stroke determined by the sampling points 2, 3, the two lower endpoints or upper endpoints corresponding to the endpoint 2 of the central line L are a group of arc points. In FIG. 2, the two lower endpoints and the two upper endpoints at the endpoint 2 corresponding to the strokes determined by the sampling points 1, 2 and the sampling points 2, 3 are at a side where the angle between the central lines is larger than 180°, that is the lower endpoints 4 and 5 are at the outer of the side, and the lower endpoints 4, 5 are the outer endpoints of the side, so the lower endpoints 4, 5 are determined as a group of arc points, similarly, the two upper endpoints 6, 7 of the two intersected strokes at the intersection point are determined as a group of arc points in FIG. 3, and the two lower endpoints 8, 9 of the two intersected strokes at the intersection point are also determined as a group of arc points in FIG. 4. In FIG. 2, the two upper endpoints of the stroke determined by the sampling points 1, 2 are a group of straight line points, and the two lower endpoints of the stroke determined by the sampling points 1, 2 are also a group of straight line points, similarly, the two upper endpoints of the stroke determined by the sampling points 2, 3 are a group of straight line points, and the two lower endpoints of the stroke determined by the sampling points 2, 3 are also a group of straight line points.

After dividing the key points of the strokes into groups based on the above-mentioned method, an outline of the stylized trace of corresponding strokes can be generated by calling the graphics library module in accordance with the type and the position information about the key points, then the generated outline may be filled with the graphics library module to display the handwriting trace with traditional stylized trace, which are described in detailed as follows:

Where the key points received by the graphics library module are a group of semi-circle points, drawing a semi-circle by taking the endpoint of the central line within the group of semi-circle points as the center, $$\frac{d}{2}$$

accordingly as the radius, and the upper and lower endpoints within the group of semi-circle points as the starting and ending points; where the received key points are a group of arc points, drawing an arc by taking one upper endpoint or lower endpoint within the group of arc points as the starting point, $$\frac{d}{2}$$

accordingly as the radius, and the other upper endpoint or lower endpoint within the arc points as the ending point; where the received key points are a group of straight line points, drawing a line by taking one upper endpoint or lower endpoint within the group of straight line points as the starting point, and the other upper endpoint or lower point of the straight line points as the ending point.

Now still takes the strokes determined by the sampling points 1, 2, 3 shown in FIG. 2 as an example for a further description, the process for the stroke end corresponding to the endpoint 1 of the central line L is: drawing a semi-circle by taking the endpoint 1 of the central line L as the center, $$\frac{d}{2}$$

accordingly as the radius, the upper endpoint corresponding to the endpoint 1 of the central line L as the starting point, the lower endpoint corresponding to the endpoint 1 of the central line as the end point; or drawing a semi-circle by taking the endpoint 1 of the central line L as the center, accordingly as the radius, the upper endpoint corresponding to the endpoint 1 of the central line L as the starting point, and the lower endpoint corresponding to the endpoint 1 of the central line L as the ending point.

The process for the straight line width of the stroke determined by the sampling points 1, 2 is: drawing a straight line by taking one upper endpoint of the stroke determined by the sampling points 1, 2 as the starting point, the other upper endpoint as the ending point, and drawing a straight line by taking one lower endpoint of the stroke determined by the sampling points 1, 2 as the starting point, the other lower endpoint as the ending point.

The strokes determined by the sampling points 1, 2 and the sampling points 2, 3 are intersected, and the intersection angle between the central line of the two intersected strokes is not 180°, therefore the endpoint 2 of the central line L corresponds to a group of arc points, and the process for the group of arc points is as follows: drawing an arc by taking the endpoint 2 of the central line L as the center, $$\frac{d_2}{2}$$

accordingly as the radius, the lower endpoint 4 of the stroke determined by the sampling points 1, 2 as the starting point, and the lower endpoint 5 of the stroke determined by the sampling points 2, 3, or drawing an arc by taking the endpoint 2 of the central line L as the center, $$\frac{d_2}{2}$$

accordingly as the radius, the lower endpoint 4 as the ending point and the lower endpoint 5 as the starting point, thus obtaining an outline of the stylized trace of the stroke determined by the sampling points 1, 2 and the sampling points 2, 3, referring to FIG. 2, then making a corresponding fill to the outline with the graphics library module for displaying.

The method for implementing a stylized trace of an original handwriting trace proposed by the present application is simple and easy to be carried out, which only needs to send the position information and type of the corresponding strokes to the graphics library module, the graphics library module then draws an outline of the stylized trace of the stroke according to the type and the position information about the key points, and fills the outline for displaying handwriting trace having original stylized trace.

What is described above is the further detailed explanation of the present application in combination with the specific embodiments; however, it cannot be considered that the specific embodiments of the present application are only limited to the explanation. For those of ordinary skill in the art, some simple deductions or replacements can also be made under the premise of the concept of the present application, and shall be all regarded as within the scope of protection of the present application.

The invention claimed is:

1. A method for implementing a stylized trace of an original handwriting trace, comprising:
   a step of sampling and detecting: sampling on contact points in real time, detecting the position information about the sampling points, and obtaining a stroke width d at the sampling points;
   a step of determining central line: determining a central line of a stroke between adjacent sampling points, where the adjacent sampling points are two endpoints of the central line;
   a step of computing position information about key points:
      computing position information about the key points of the stroke in accordance with the central line and the stroke width d at the corresponding sampling points, where the key points of the stroke include the two endpoints of the central line of the stroke between adjacent sampling points as well as the upper and lower endpoints corresponding to the two endpoints; and
      determining the upper and lower points corresponding to the two endpoints of the central line in accordance with the central line and the stroke width d at the endpoint of the central line;
   a step of dividing key points: dividing the key points of the stroke into groups to determine the type thereof as semi-circle points, arc points, or straight line points according to whether the stroke is intersected with other stokes, wherein if one end or both ends of the stroke are failed to intersect with other strokes, the end failed to intersect with other strokes is the stroke end of the stroke, the endpoint of the central line corresponding to the stroke end as well as the upper and lower endpoints corresponding to the endpoint of the central line are a group of semi-circle points; and
   a step of generating a stylized trace: generating an outline of the stylized trace of the corresponding stroke by drawing an arc and/or a line according to the position information and the type of the key points of the stroke, and filling the outline for displaying.

2. The method according to claim 1, wherein the step of generating a stylized trace comprises drawing an arc and/or a line to generate an outline of the stylized trace of the corresponding stroke by calling a graphics library module, and filling the outline for displaying through the graphics library module.

3. The method according claim 1, wherein the step of sampling and detecting comprises detecting a pressure value about the sampling points, and obtaining the stroke width d of the sampling points based on the pressure value about the sampling points.

4. The method according to claim 1, wherein determining the upper and lower endpoints corresponding to the endpoint of the central line comprises: determining the points on a straight line with a distance $$\frac{d}{2}$$

away from the endpoint of the central line as the upper endpoint and lower endpoint corresponding to the endpoint of the central line, where the straight line is perpendicular to the central line and intersected with the endpoint of the central line.

5. The method according to claim 4, wherein determining the upper and lower endpoints corresponding to the endpoint of the central line comprises: determining the unit normal vector $\vec{i}$ perpendicular to the central line, at the endpoint of the central line, the upper endpoint of the stroke corresponding to the endpoint of the central line is obtained by $$\frac{d}{2} \cdot \vec{i}$$

and the lower endpoint of the stroke corresponding to the endpoint of the central line is obtained by $$\frac{d}{2} \cdot (-\vec{i}).$$

6. A method for implementing a stylized trace of an original handwriting trace, comprising:
   a step of sampling and detecting: sampling on contact points in real time, detecting the position information about the sampling points, and obtaining a stroke width d at the sampling points;
   a step of determining central line: determining a central line of a stroke between adjacent sampling points, where the adjacent sampling points are two endpoints of the central line;
   a step of computing position information about key points: computing position information about the key points of the stroke in accordance with the central line and the stroke width d at the corresponding sampling points, where the key points of the stroke include the two endpoints of the central line of the stroke between adjacent sampling points as well as the upper and lower endpoints corresponding to the two endpoints; wherein the step of computing position information about key points comprises: determining the upper and lower points corresponding to the two endpoints of the central line in accordance with the central line and the stroke width d at the endpoint of the central line;
   a step of dividing key points: dividing the key points of the stroke into groups to determine the type thereof as semi-circle points, arc points, or straight line points according to whether the stroke is intersected with other stokes, wherein if the stroke is intersected with other strokes, judging whether the intersection angle between the central lines of the two intersected strokes is equal to 180°, if yes, no management is treated to the intersection point between the two intersected strokes, otherwise, the two outer endpoints at the side where the intersection angle between the central lines of the two intersected strokes is larger than 180° are determined as a group of arc points, where the two outer endpoints are respectively an upper endpoint or a lower endpoint at the intersection between the two intersected strokes; two upper endpoints and two lower endpoints of the stroke between adjacent sampling points are respectively determined as a group of straight line points; and a step of generating a stylized trace: generating an outline of the stylized trace of the corresponding stroke by drawing an arc and/or a line according to the position information and the type of the key points of the stroke, and filling the outline for displaying.

7. The method according to claim 6, wherein the step of generating a stylized trace comprises: if the received key points are determined as a group of semi-circle points, draws a semi-circle by taking the endpoint of the central line within the group of semi-circle points as the center, $$\frac{d}{2}$$

accordingly as the radius, and the upper and lower endpoints within the group of semi-circle points as starting and ending points.

8. The method according to claim 6, wherein the step of generating a stylized trace comprises: if the received key points are determined as a group of arc points, draws an arc by taking one upper endpoint or lower endpoint within the group of arc points as a starting point, $$\frac{d}{2}$$

accordingly as the radius, the other upper endpoint or lower endpoint within the group of arc points as an ending point; if the received key points are determined as a group of straight line points, draws a straight line by taking one upper endpoint or lower endpoint within the group of straight line points as a starting point, and the other upper endpoint or lower endpoint within the group of straight line points as an ending point.

9. The method according to claim 6, wherein the step of generating a stylized trace comprises drawing an arc and/or a line to generate an outline of the stylized trace of the corresponding stroke by calling a graphics library module, and filling the outline for displaying through the graphics library module.

10. The method according claim 6, wherein the step of sampling and detecting comprises detecting a pressure value about the sampling points, and obtaining the stroke width d of the sampling points based on the pressure value about the sampling points.

11. The method according to claim 6, wherein determining the upper and lower endpoints corresponding to the endpoint of the central line comprises: determining the points on a straight line with a distance $$\frac{d}{2}$$

away from the endpoint of the central line as the upper endpoint and lower endpoint corresponding to the endpoint of the central line, where the straight line is perpendicular to the central line and intersected with the endpoint of the central line.

12. The method according to claim 11, wherein determining the upper and lower endpoints corresponding to the endpoint of the central line comprises: determining the unit normal vector 7 perpendicular to the central line, at the endpoint of the central line, the upper endpoint of the stroke corresponding to the endpoint of the central line is obtained by $$\frac{d}{2} \cdot \vec{i}$$

and the lower endpoint of the stroke corresponding to the endpoint of the central line is obtained by $$\frac{d}{2} \cdot (-\vec{i}).$$

13. A device for implementing a stylized trace of an original handwriting trace, comprising:

a sampling module, configured for sampling on contact points in real time, detecting the position information about the sampling points, and obtaining a stroke width d at the sampling points;

an arithmetic processing module, connected to the sampling module, configured for determining a central line of a stroke between adjacent sampling points according to the position information about the sampling points, where the adjacent sampling points are two endpoints of the central line, computing the position information about the key points of the stroke in accordance with the central line and the stroke width d at the corresponding sampling points that comprises determining the upper and lower points corresponding to the two endpoints of the central line in accordance with the central line and the stroke width d at the endpoint of the central line, and dividing the key points of the stroke into groups to determine the type thereof as semi-circle points, arc points or straight line points according to whether the stroke is intersected with other strokes, wherein if one end or both ends of the stroke are failed to intersect with other strokes, the end failed to intersect with other strokes is the stroke end of the stroke, the endpoint of the central line corresponding to the stroke end as well as the upper and lower endpoints corresponding to the endpoint of the central line are a group of semi-circle points, wherein dividing the key points of the stroke into groups to determine the type thereof in the step of dividing key points comprises: if the stroke is intersected with other strokes, judging whether the intersection angle between the central lines of the two intersected strokes is equal to 180°, if yes, no management is treated to the intersection point between the two intersected strokes, otherwise, the two outer endpoints at the side where the intersection angle between the central lines of the two intersected strokes is larger than 180° are determined as a group of arc points, where the two outer endpoints are respectively an upper endpoint or a lower endpoint at the intersection between the two intersected strokes; two upper endpoints and two lower endpoints of the stroke between adjacent sampling points are respectively determined as a group of straight line points; and a graphics library module, connected to the arithmetic processing module, configured for generating an outline of the stylized trace of the corresponding stroke in accordance with the position information and the type of the key points, and filling the outline for displaying;

where the key points of the stroke include the two endpoints of the central line of the stroke between adjacent sampling points as well as the upper and lower endpoints respectively corresponding to the two endpoints.

14. The device according to claim 13, wherein the sampling module is a pressure sampling module which detects the pressure value about the sampling points, and obtains the stroke width d at the sampling point in accordance with the detected pressure value about the sampling points.

* * * * *